United States Patent Office 3,178,342
Patented Apr. 13, 1965

3,178,342
THERAPEUTIC COMPOSITION CONTAINING ACETYLGLUTAMIC ACID SALT OF DI-METHYLAMINOETHANOL
André Buzas, Bievres, France, assignor, by mesne assignments, to Interco Fribourg S.A., Fribourg, Switzerland, a Swiss private company
No Drawing. Filed Nov. 10, 1961, Ser. No. 151,437
Claims priority, application France, Nov. 25, 1960, 845,001
3 Claims. (Cl. 167—55)

This invention relates to a salt of dimethyl aminoethanol and a derivative of glutamic acid having in particular a remarkable effect on effections of the motory system of human beings, and also on the psychic and motor development of encephalopaths. The invention also relates to the process of production of the salt in question.

It is known that glutamic acid of the formula $HO_2CCH_2CH_2CH(NH_2)CO_2H$ has a certain amount of therapeutical power as a cerebral stimulant. In particular it has been proposed to use it for the treatment of the mentally retarded. However tests carried out on human beings have been much less convincing than those carried out on animals.

A certain degree of physiological action is also attributed to dimethyl aminoethanol of the formula $(CH_3)_2NCH_2CH_2OH$. Some authors would regard this substance as sympathico-tonic, while others, on the other hand, regard it as sympathicolytic, so that this action, if there is any, is very weak and erratic.

The above two substances do not have any action on affections of the motory system.

It is one of the objects of the invention to obtain a novel and valuable glutamic salt of dimethyl aminoethanol with a particularly intense action on affections of the motory system of human beings.

Another object of the invention is to produce a glutamic salt of dimethyl aminoethanol having a stimulating action on the cerebral cortex, and also a sedative and settling action on the control centres of the central nervous system.

Other objects of the invention and advantageous features of the same will further appear from the following description.

The novel and valuable glutamic salt of dimethyl aminoethanol which is the subject matter of the invention is the acetyl glutamate of dimethyl aminoethanol, with the molecular formula $C_{11}H_{22}N_2O_6$ and of the structural formula:

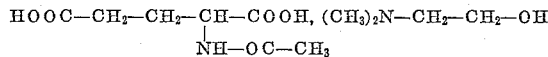

This substance is a salt which occurs in the form of an almost colourless yellow oil, non-crystallizable, hygroscopic, and soluble in water and methyl and ethyl alcohols. The saline function of the compound in question results from the neutralisation of one of the acid functions of the acetyl glutamic acid by the basic function of the dimethyl aminoethanol.

The product may be identified first by the determination of total nitrogen contained therein by the well known Kjeldahl method.

The components may be determined as follows:

Dimethyl aminoethanol. This product is displaced by soda and thereafter carried out by steam distillation. After condensation of the vapours, the determination is made by extracting the dimethyl aminoethanol with ether and precipitating it in the picrate state (melting point 92–93° C.). The titration may be performed by acidimetry (for instance sulfuric acid in the presence of methyl red—methylene blue as indicator).

Acetyl glutamic acid. It may be identified by acidifying an aqueous concentrated solution of the salt with hydrochloric acid and cooling the solution. Fine needles are formed which melt at 210–212° C.

It is possible to titrate the acetyl glumatic acid direct in the presence of a large excess of pyridine by means of tetrabutyl ammonium hydrate in the presence of thymol blue.

The product forming the subject matter of the invention has been tried on animals and on human beings, and these tests have shown that it possesses important pharmacodynamic properties.

The $LD_{50}$ for mice is 3.35 g./kg. A dog stood up well to a dose of 400 mg./kg. for several weeks. Thus, both the acute and the chronic toxicity are extremely low and the therapeutic index (lethal dose 50/active dose) is very high: of the order of magnitude of 50 to 60.

Study of the action on the nervous system of animals has given the following results, for mice, rates and rabbits:

(1) In a case of rats, injected intraperitoneally, the above-mentioned substance has a sedative action without any hypnotic effect (Lim test) (Lim, R. K., Pindell, N. F., Glass, H. G., Rink, K., Ann. N.Y. Acad. Sci., 1956; 64 667 in Valette, G., Précis de Pharmacodynamic, p. 152, Masson, ed., Paris, 1959). The duration of this effect increases in proportion to the dosage of product injected (from 100 to 500 mg./kg.). This substance is also a potentialising agent of narcosis in which case activity is proportional to the dose. It sends animals back to sleep on an average in 6 minutes at 50 mg./kg. and in 15 minutes with a dose of 100 mg./kg. (Fouts and Brodie test, J.P.E.T. 1956, 116, 480).

(2) In the case of mice injected subcutaneously with a dose of 50 mg./kg., the acetyl glutamate of dimethyl aminoethanol diminished by 50% the mortality due to pentetrazol, reduced by half the intensity of convulsions observed 15 minutes after the injection of the poison and put an end to the convulsions by the 30th minute.

(3) In the case of rabbits, the acetyl glutamate of dimethyl aminoethanol with a dose of 600 mg./kg. considerably reduced the mono- and polysynaptic transmedullar reflexes (Sherrington reflexes: short reflexes).

(4) The electroencephalographic study of the above-mentioned derivative on different cerebral centres was carried out in the case of rabbits by means of the electrodes in situ technique of J. Faure (Bordeaux).

The product was injected with a dose of 100 mg./kg. intraperitoneally. Under the action of the acetyl glutamate of dimethyl aminoethanol, the cortex showed improved ability to react to the stimulus, improved working efficiency and appeared to obey the reticulate formation moderately well. As regards this last, after a considerable early rise in responses, they were found to gradually diminish. In general, the condition of this formation tended towards an hypo-excitability and a braking effect.

The secondary reactions of acetyl glutamate of dimethyl aminoethanol are practically non-existent, as was shown for instance by an experiment with a rabbit. A dose of 600 mg./kg. (say 5 times the pharmacodynamically active dose) had no action on cardiac functioning, on arterial tension, or on respiration.

Experiments with animals have thus shown that acetyl glutamate of dimethyl aminoethanol causes hyperexcitability with improved working of the cortex and of its subjacent centres (thalamus) and a sedative action on the hyperexcited formations, without being of a depressive character. In other words, this result has stimulating properties on the cerebral cortex and a sedative action on the control centres of the central nervous system. While exerting a settling action on nervous functioning, this substance has no effect on the autonomous nervous system and the peripheral organs which it controls.

The results of the above pharmacological tests have been confirmed by clinical experiments on human beings. These experiments brought out clearly the really remarkable action on the motivity, as the following observations will show.

OBSERVATION NO. 1

Mr. de M—, 57 years old. Illness, followed 15 years ago by a progressive, practically total spasmodic paraplegia appearing as a serious affection of the right upper member and a slight affection of the left upper member. The patient was depressed and anxious.

Treatment began with a dose of 4 grammes per day of acetyl glutamate of dimethyl aminoethanol, and was continued for 12 days. During this treatment the patient felt well, experienced a complete change and noticed a considerable improvement in his movements. He was able to raise his right upper member and to carry out ordinary movements. Suspension of the treatment led to a regression in the improvement within 5 to 6 days.

Resumption of the treatment brought new well-being and improvement of the muscular strength of the right and left upper members, permitting resumption of ordinary everyday gestures, which had been impossible for one to two years.

A muscular test was carried out on resumption of treatment, after a week. The strength of the right upper member was found to have improved in abduction, the corresponding angle from 80° to 90°. Elevation was likewise improved, the angle being brought from 90° to 100°. Flexing and extension of the forearm were likewise improved by contrast with the previous condition. The patient could also clench the dynamometer and move the needle.

On the left side, strength measured by the dynamometer passed from 12 to 18.

OBSERVATION NO. 7

Mr. BR—, 51 years old. Right and left hemiplegia. Generalised contracture—tendinous reflexes—complete incontinence.

The patient received 3 times a week for 2 months an intromuscular procaine injection. This treatment did not bring any noticeable improvement. The patient was then given everyday for 6 weeks 2 ampoules each of 2 g. of acetyl glutamate of dimethyl aminoethanol.

This treatment had an extraordinary influence on all the symptoms. Within 15 days incontinence had completely ceased. The patient could speak clearly. Mental confusion ceased completely. The hemiplegia had considerably decreased. The contracture disappeared. The patient was able to walk and could descend stairs by himself. At the beginning of the treatment he could barely draw with a pencil a wobbly line 1 to 3 cm. long. At the end of the treatment he could make very correct drawings. The result obtained is lasting; the patient has been able to go home.

Numerous similar observations have been made on patients incapable of rising or walking, who after treatment could resume normal motor activity.

Clinical tests have further shown that the product in accordance with the invention has other beneficial effects.

For example, a marked encephalopath, five and a half years old, markedly hypertonic, completely indifferent, incapable of sitting up, inert and not speaking was subjected to 35 days treatment at the rate of one ampoule per day of 0.5 g. active agent.

An improvement was noticed after the fifth day. At the end of the treatment a remarkable regression of the hypertony was noticed, the patient sat up with support and laughed and played, which constituted a remarkable improvement in view of the serious nature of the case.

The product is very good as regards tolerance. Various observations made have thus enabled the therapeutical features of acetyl glutamate of dimethyl aminoethanol to be determined as follows:

(a) Principally: treatment of secondary motor affections arising from a lesion of the central nervous system (hemiplegia, paraplegia of circulatory or traumatic origin, cerebral vascular scleroses).

(b) Secondarily: treatment of defects of the neuroleptic cure of depressive psychoses.

(c) Treatment of mild cases of psychic and motor asthenia, favourable action on muscular fatigue and settling action on behaviour troubles particularly those arising from the stress of modern life.

(d) Improvements in condition of encephalopaths.

For therapeutic treatments acetyl glutamate can be administered at the rate of 2 to 6 g. per day.

It is preferably handled pharmaceutically in ampoules which can be drunk, containing the dose of acetyl glutamate of dimethyl aminoethanol, diluted in water, with if necessary the usual products for ampoules of this kind (sugar, artificial perfume, conserving agents protecting against mildew, such as paraoxybenzoates of methyl or propyl).

It is thus possible to obtain 5 ml. ampoules containing 0.5 g. of active agent and 10 ml. ampoules containing 2 g.

*Example of 10 ml. ampoule which can be drunk*

| | | |
|---|---|---|
| Acetyl glutamate of dimethyl aminoethanol | g | 2 |
| Excipient, q.s.p. | ml | 10 |
| Of which: saccharose | g | 4 |
| Soluble essence of orange | ml | 0.05 |
| Methyl paraoxybenzoate | g | 0.00333 |
| Proply paraoxybenzoate | g | 0.00167 |
| Distilled water, q.s.p. | ml | 10 |

The acetyl glutamate of dimethyl aminoethanol can be prepared by dissolving in water an equimolecular mixture of its constituents: acetyl glutamic acid and dimethyl aminoethanol.

NUMERICAL EXAMPLE 1

89.14 g. of dimethyl aminoethanol are added while stirring to a suspension of 189.13 g. acetyl glutamic acid in 2200 cc. of water. Stirring is continued till solid matter is completely dissolved. The solution obtained is diluted to the concentration desired.

NUMERICAL EXAMPLE 2

For industrial preparation of the above solution to obtain drinkable ampoules it is possible to operate as follows:

In the first stage a syrup is prepared by dissolving hot 40 kg. of officinal white sugar in 25 litres of distilled water.

In another receptacle there are dissolved cold in 20 litres of distilled water:

6.400 kg. dimethyl aminoethanol,
33.3 grammes of methyl paraoxybenzoate, and
16.7 grammes of propyl paraoxybenzoate.

To this solution there is added: 13.600 kg. acetyl glutamic acid dissolved by mechanical stirring and gentle heating.

The two solutions are then mixed and there is added to them:

500 ml. of orange essence.
Complete to 100 litres with distilled water.
Filter and distribute in 10 ml. ampoules.
Sterilise in an autoclave.

What I claim is:

1. A therapeutic composition for oral administration, comprising ampoules containing a drinkable solution of from 0.5 to 2 grams of the acid salt of acetyl glutamate and 2-dimethylamino-ethanol-1 in a pharmaceutically acceptable carrier.

2. A therapeutic composition for oral administration, comprising ampoules containing a drinkable suspension of from 0.5 to 2 grams of the acid salt of acetyl glutamate and 2-dimethylamino-ethanol-1 in a pharmaceutically acceptable carrier.

3. A therapeutic composition, comprising a dosage unit range of from 0.5 to 2 grams of the acid salt of acetyl glutamate and 2-dimethylamino-ethanol-1 in a pharmaceutically acceptable aqueous carrier.

References Cited in the file of this patent

UNITED STATES PATENTS

| | | |
|---|---|---|
| 2,802,864 | Vassel | Aug. 13, 1957 |
| 2,867,654 | Town | Jan. 6, 1959 |
| 2,872,374 | Beiler et al | Feb. 3, 1959 |
| 2,877,156 | Janssen et al. | Mar. 10, 1959 |
| 2,945,879 | Sollin | July 19, 1960 |
| 3,020,201 | Osterberg | Feb. 6, 1962 |
| 3,088,871 | Pfeiffer | May 7, 1963 |

OTHER REFERENCES

Yamamura et al.: Chem. Abst., vol. 48, pages 2257–2258, 1954.

Block et al.: Chem. Abst., vol. 41, pages 7481–7482, 1947.

Lesser: Drug and Cosmetic Industry, vol. 79, No. 4, April 1952, page 476.

Pfeiffer: International Review of Neurobiology, vol. 1, 1959, page 227.